United States Patent [19]

Eumurian

[11] 4,443,890
[45] Apr. 17, 1984

[54] OPTICAL-CONNECTION DIRECT-LIGHT MODULATION INFORMATION TRANSMISSION SYSTEM WITH A PASSBAND EXTENDED TOWARDS THE LOW FREQUENCIES AND CONTINUOUS WAVES

[75] Inventor: Grégoire Eumurian, Paris, France
[73] Assignee: Thomson-CSF, Paris, France
[21] Appl. No.: 326,203
[22] Filed: Dec. 1, 1981

[30] Foreign Application Priority Data

Dec. 2, 1980 [FR] France ............................ 80 25560

[51] Int. Cl.³ ............................................... H04B 9/00
[52] U.S. Cl. ..................... 455/613; 455/617; 455/618; 455/619
[58] Field of Search ............... 455/601, 606, 607, 609, 455/610, 612, 613, 617, 618, 619, 608

[56] References Cited

U.S. PATENT DOCUMENTS

| | | | |
|---|---|---|---|
| 3,729,633 | 4/1973 | Eros et al. | 455/619 |
| 3,984,824 | 10/1976 | Blackburn. | |
| 4,207,459 | 6/1980 | Nakamura et al. | 455/613 |
| 4,257,125 | 3/1981 | Theall, Jr. | 455/619 |

FOREIGN PATENT DOCUMENTS 499317 2/1939 United Kingdom.

OTHER PUBLICATIONS

Hemmings et al. Digital All Dielectric Entrance Links in the Telephone Plant–Conf Intelcon 79 Exp. Proc. Dallas TX. (Feb. 26–Mar. 2, 1979), pp. 150–155.
Umebu et al., *GaAlAs LED's For High Quality Fiber-Optical Analog Link*, 1977, pp. 109–112.

*Primary Examiner*—Joseph A. Orsino, Jr.
*Attorney, Agent, or Firm*—Cushman, Darby & Cushman

[57] ABSTRACT

The invention provides a direct-light modulation information transmission system comprising an optical connection having at its input emission means and at its output reception means both sensitive to the junction temperature, this sensitivity creating at low frequencies defects affecting the transmission of said frequencies. Filtering means are provided, both at the emission side and at the reception side, for compensating for the linear and nonlinear thermal effects of the emission means and the linear thermal effects of the reception means.

8 Claims, 18 Drawing Figures

FIG_11  FIG_12  FIG_13

001,443,890

OPTICAL-CONNECTION DIRECT-LIGHT MODULATION INFORMATION TRANSMISSION SYSTEM WITH A PASSBAND EXTENDED TOWARDS THE LOW FREQUENCIES AND CONTINUOUS WAVES

BACKGROUND OF THE INVENTION

The present invention relates to an optical-connection direct-light modulation information transmission system and more particularly an optical connection for which it is sought to extend the passband to low frequencies and continuous waves.

It is known that the use of optical fibers combined with that of rapid optical emitters, laser diodes in particular and avalanche photodiodes allows wideband connections to be obtained up to 1 GHz. It is also known that the optical connections present, with respect to electrical connections, the advantage of galvanic insulation and an extended passband, but the disadvantage of attenuation which may vary more especially during operation, variation of the emission power, variation of the losses of the connectors, variation of the efficiency of the receiver.

To get over these variations, it is possible to code the information to be transmitted either by frequency modulation or by pulse code modulation (PCM).

These types of coding further allow the passband to be extended to low frequencies down to frequency 0. Unfortunately the total band occupied is three to ten times more extensive than the usual passband.

The direct modulation of the power produced by the emission diode allows transmission to be obtained whose passband is identical to that of the useful signal. But on the other hand, because of a series of thermal phenomena appearing not only at emission but also at reception, the transmission of the low frequencies and in particular frequency zero takes place under poor conditions and defects such as attenuations, distortions, drifts appear.

SUMMARY OF THE INVENTION

The aim of the present invention is to eliminate these different defects while conserving the advantages of direct modulation which in particular permits a transmission in which the occupied bandwidth is minimum.

In accordance with the invention, an optical-connection direct-light modulation information transmission system with a passband extended to the low frequencies and continuous waves, in which the optical connection comprises at its input emission means transforming the electric signals applied into optical signals and at its output reception means transforming the optical signals into electrical signals, these means being moreover responsive to the temperature, within the range of low frequencies and at a zero frequency is characterized by the fact that it comprises, both at the emission side and at reception side, first filtering means compensating for the nonlinear, on the one hand, and the linear, on the other, thermal effects of the emission means and second filtering means compensating for the linear thermal effects of the reception means.

BRIEF DESCRIPTION OF THE DRAWINGS

Other characteristics and advantages of the invention will appear from the following description of embodiments, with reference to the figures which show:

FIG. 11, the transmission system of the invention using at emission a LED diode or a laser diode and at reception a PIN photodiode;

FIG. 12, an example of a device for biasing the emission diode; and

FIG. 13, the transmission system of the invention using at emission a LED diode or a laser diode and at reception an avalanche photodiode.

DESCRIPTION OF THE PREFERRED EMBODIMENTS

Figure 1:
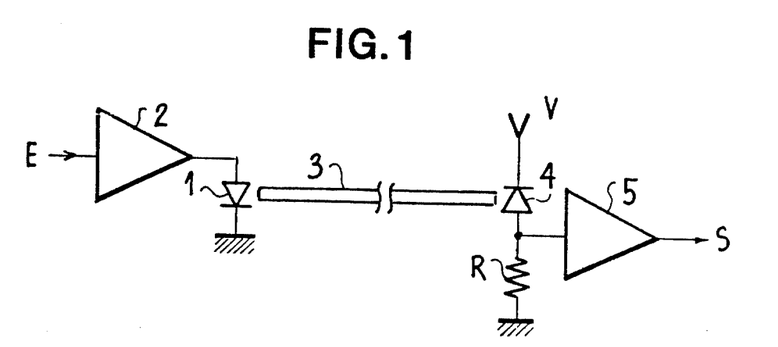
FIG. 1, a diagram of an optical connection.

An optical connection in a transmission system to which the invention relates is composed essentially as is shown in FIG. 1 of an optical emitter 1 generally preceded by an amplifier 2, the optical connection properly speaking 3 and an optical receiver 4 followed by an amplifier 5.

Figure 2A:
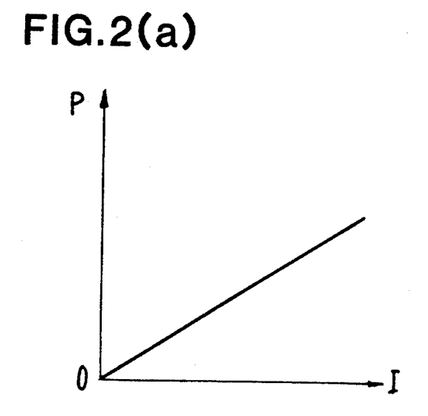
FIGS. 2a and 2b, the current-power characteristics of a LED diode and of a laser diode respectively.
Figure 2B:
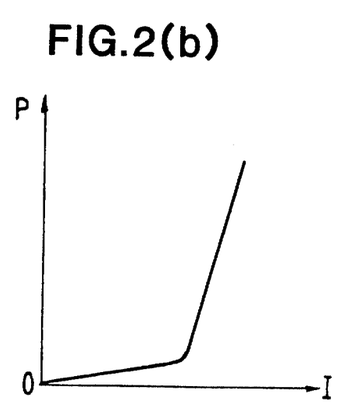

The emission diode may be of the LED or laser type. The reception photodiode is of PIN or avalanche type. The different emission diodes are essentially characterized by their emitted power function with respect to the injected current. For an analog transmission, this characteristic must be as linear as possible. The different types of diodes mentioned present linear P-I characteristics over the whole range of the characteristic, this is the case for the LED diodes or only over a part, this is the case of the laser diodes. These characteristics are shown in FIG. 2a for a LED diode and in FIG. 2b for a laser diode.

Figure 3A:
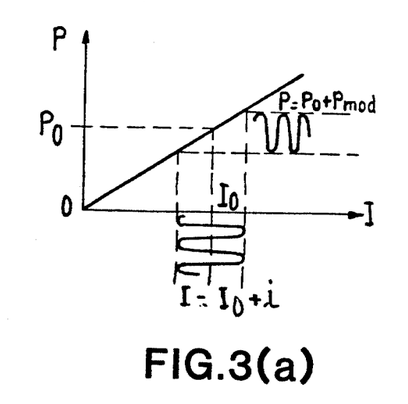
FIGS. 3a and 3b, the modulation respectively of a LED diode and a laser diode.
Figure 3B:
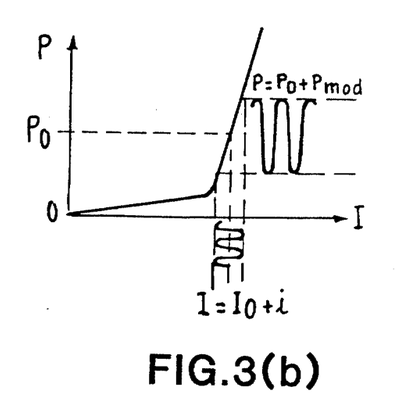

The modulation of these diodes is provided by biasing the component with a quiescent current Io and by superimposing on this latter an alternating modulation current causing the emission power to vary and forming the signal. FIG. 3a shows this modulation for a LED diode and FIG. 3b for a laser diode.

The reception photodiodes, whether they are of PIN or avalanche type, effect on arrival the reverse transformation by delivering a current proportional to the power received.

I=gP where g represents the power-current conversion slope.

This current creates a potential difference through a resistor and may then be amplified.

The current-power conversion characteristic at the emitters and the power-current conversion characteristic at the avalanche diode receivers present a great dependence with respect to the temperature of the junction. Thus, the behavior of these components is very different according as to whether the modulating signal is at low or high frequency.

This dependence generally results in a lowering of the emitted power when the temperature increases for the emission diodes and a lowering of the conversion slope g causing lowering of the photocurrent for the avalanche photodiodes.

Figure 4A:
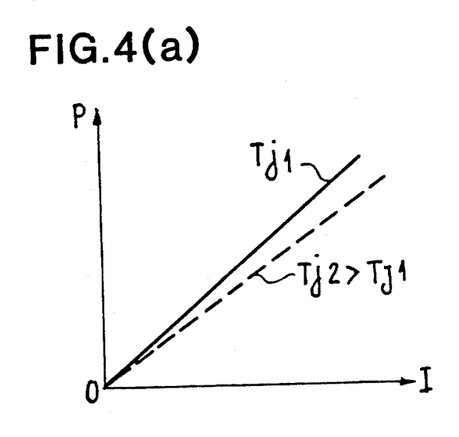
FIGS. 4a and 4b, the modifications undergone, because of the temperature, by the current-power characteristics of a LED diode and a laser diode respectively.
Figure 4B:
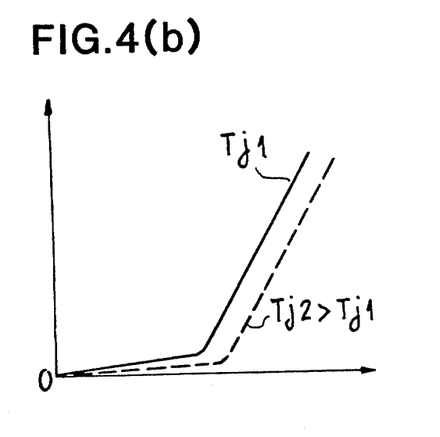

FIGS. 4a and 4b illustrate respectively, for a LED diode and a laser diode, the dependence of the power as a function of the temperature.

Figure 5:
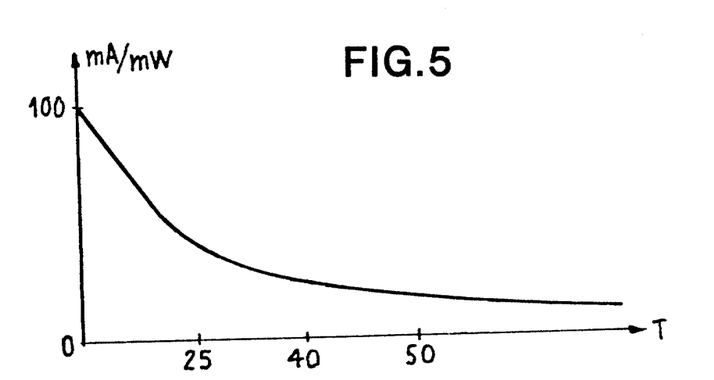
FIG. 5, the variation of the conversion slope of an avalanche photodiode as a function of the temperature.

FIG. 5 illustrates the development of the conversion slope of an avalanche photodiode with respect to the temperature.

It follows from the preceding that the components are sensitive to the temperature. However this dependence differs depending on the rate of variation of the current at emission or of the power at reception. In fact, if the current modulating the emission diode or the optical power of the avalanche photodiode varies rapidly, the junction temperature of the component does not have time to vary and remains constant in time. On the other hand, if the frequency is very low, the junction heats up or cools down depending on the instantaneous level of the signal, modifies the characteristics of the components and introduces a deformation of the signal. This deformation is all the greater, the greater the modulation signal.

We may then say that the poor behavior of the optical components mentioned above appears for a low-frequency or continuous high-amplitude signal and that, on the other hand, their behavior is correct for higher-frequency signals, whatever their level and relatively correct for low-frequency signals of low amplitude.

The result is that at a low level there is a linear thermal effect depending on the thermal impedance of the junctions of the emitter or of the avalanche receiver. This effect is caused by progressively passing, depending on the increase of the frequency, from the condition where the temperature of the junction varies with the signal to the condition where, because of the rate of variation, the temperature of the junction remains constant and equal to its value at the quiescent point (bias). This high-pass type linear effect may be compensated for by means of one or two low-pass filters 7 and 9 placed in the optical chain, a filter for a connection comprising a LED diode or laser and a PIN photodiode, and two filters in the case when an avalanche diode is used having the same type of thermal effect as the emitter.

At a high level, the thermal effect becomes nonlinear at low frequency where the temperature of the junction undergoes considerable variations. On the other hand, at a high level and for high frequencies, since the temperature of the junction does not have time to change, this nonlinear effect does not exist. In order to eliminate this nonlinear thermal effect, there is placed in front of the emitter a high-pass type filter 8 which limits the low frequencies to a low level and this down to a frequency beyond which the thermal phenomena no longer occur and at reception a low-pass filter 6 having a reverse transfer function which perfectly re-establishes the shape of the signal.

Figure 6:
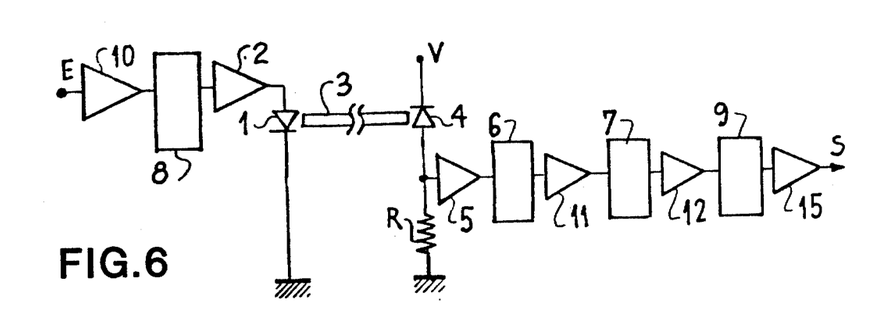
FIG. 6, the simplified diagram of the transmission system of the invention compensated for the low frequencies.

FIG. 6 gives the simplified diagram of a chain compensated for the low frequencies.

It can be seen that, because of the high-pass filter placed at the emission side, the low-frequency power reaching the photodiode is at a low level and there are then no nonlinear thermal effects at the level of the receiver.

It will be noted that the simplified diagram of FIG. 6 may be used whatever the type of emitter or receiver used, only the value of the cut-off frequencies of the filters being modified in the following cases.

There will be analysed in more detail hereafter the operation of an optical chain comprising a LED emission diode and a PIN type reception photodiode. In this type of connection only the emission diode is sensitive to the temperature, the PIN photodiode presenting a constant response. The power emitted by a LED diode varies linearly with the injected current for a given temperature of the junction.

Moreover, the temperature of the junction depends on the power dissipated in the diode, on the ambient temperature and on the thermal resistance between the junction and the case and between the case and the ambient temperature.

Figure 7:
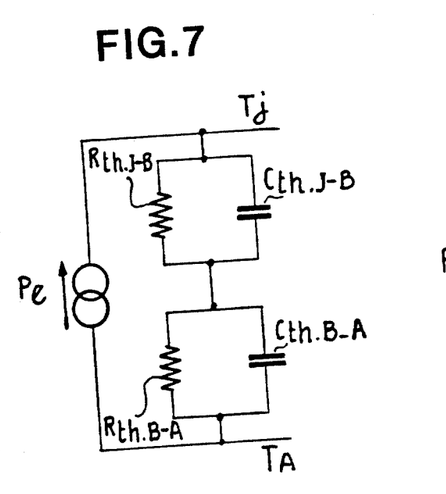
FIG. 7, the theoretical model of a LED diode.
Figure 8:
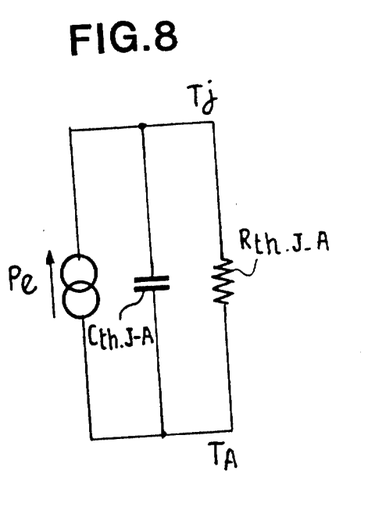
FIG. 8, the simplified model of a LED diode.

Each of the thermal resistances is in parallel with a thermal capacity and the theoretical model of the diode is given in FIG. 7 in which the symbols used represent:

$P_e$ the electric power dissipated in the diode
$T_j$ the junction temperature
$T_A$ the ambient temperature
$T_B$ the temperature of the case
$Rth_{J-B}$ the junction-case thermal resistance
$Rth_{B-A}$ the case-ambient thermal resistance
$Cth_{J-B}$ the junction-case thermal capacity
$Cth_{B-A}$ the case-ambient thermal capacity If the diode is mounted on a heat sink of low thermal resistance, there is little difference between the temperature of the case and the ambient temperature and the model may be simplified, becoming such as shown in FIG. 8 where only the following are considered: the junction-ambient thermal resistance $Rth_{J-A}$ and the junction-ambient thermal capacity $Cth_{J-A}$.

The electric power injected into the diode $P_e$ depends on the current which flows through the diode as well as on its voltage, this latter parameter being substantially independent of the current in the case of a LED or laser diode.

This may be written $P_e = IV_D$ with I the current in the LED diode, and $V_D$ the constant voltage at the terminals of the diode.

The temperature of the junction may be determined as a function of the electric power and of the thermal impedance:

$$Z_{th} = \frac{Rth_{J-A}}{1 + Rth_{J-A} Cth_{J-A} S} \quad (1)$$

of the junction (with $s = j\omega$)

$$P_e = IV_D = (I_o = i)V_b$$

with:
$I_o$ = average biasing current
$i$ = alternating current
$T_J = T_A + I_o V_D Rth_{J-A} + iV_D Z_{th}$
$T_J = T_{A'} + iV_D Z_{th}$ with
$T_{A'} = T_A + I_o V_D Rth_{J-A}$ = temperature of the junction in the absence of modulation.

The optical power emitted by the diode may be written:

$$P_{opt} = gIK$$

In this relationship g represents the current-optical power conversion slope and K a coefficient depending on the temperature of the junction:

$$K = 1 - m(T_j - T_{Jref})$$

with:
m = a constant $\ll 1$
$T_{Jref}$ = reference temperature
From the value of Pe and K we may write:

$$Popt = g(Io+i)K = g(Io+i)[-m(T_{A'} + iV_D Zth - T_{Jref})]$$

If we write $T_{A'} - T_{Jref} = To'$.

$$Popt = g(Io+i)(1 - mTo' - mV_D Z_{th}i)$$

The continuous and the alternating power of modulation may be shown:

$$Popt = Po + Pmod = gIo(1-mTo') + [g(1-mTo') - IomV_D Zth]i - gmV_S Zth i^2$$

With $Po = gIo(1-mTo')$.

$$Pmod = [g(1-mTo') - IomV_D Zth]i - gmV_D Zth\ i^2 \quad (2)$$

These relationships link together the current injected in the diode and the optical power emitted. It can be seen that the modulated signal does not vary linearly with the current of the modulation. From the value of Pmod several cases may be distinguished:

(a) High-frequency modulation (low or high level)
In this case $s \to \infty$ and $Zth \to 0$ $$(Pmod)_{f \to \infty} = g(1-mTo')i$$

that is to say a linear dependence of the modulated power as a function of the current.

(b) Very-low-level modulation
In this case, the term at $i^2$ becomes negligible with respect to the term at i.

$$(Pmod)_{i \to 0} = [g(1-mTo') - IomV_D Zth]i$$

Again a linear dependence of the power is obtained as a function of the current but the modulation slope has passed from $g(1-mTo')$ to $g(1-mTo') - IomV_D Zth$, that is to say a lower value and dependent on the thermal impedance Zth of the junction.

(c) High-level and low-frequency modulation
In this type of modulation:

$$Pmod = [g(1-mTo') - IomV_D Zth]i - gmV_D Zth\ i^2$$

The modulated power varies parabolically with the current and depends on the thermal resistance. There appears then a distortion of the signal (this distortion disappears completely if the modulation frequency becomes high).

These different types of behavior are due to the fact that at high frequencies, as was mentioned above, the temperature of the junction does not have the time to develop whatever the amplitude of the signal and that at a low amplitude the signal emitted in the form of optical power, although dependent on the thermal impedance, varies linearly; in actual fact, a small part of the parabola is swept which is comparable with its tangent to the biasing point.

It is thus perfectly possible to correct at low frequency the behavior of the LED emitter.

According to the invention, the electric signal for modulating the LED diode is attenuated by means of a high-pass filter and we return to a modulator at a low level for low frequencies and at a normal level for high frequencies.

The correct signal is re-established by means of a reverse transfer function filter placed across the PIN reception diode.

The linear effect due to the thermal impedance of the junction is corrected by means of a low-pass filter placed at reception.

The need for the latter correction appears clearly if we replace the value of $Z_{th}$ (1) in the relationship (2) Pmod:

$$Pmod = \left[ g(1 - mTo') - IomV_D \frac{R_{th}}{1 \cdot R_{th}C_{th}s} \right] i - gmV_D \cdot \frac{R_{th}\ i^2}{1 + R_{th}C_{th}s}$$

Pmod may be written in the form:

$$Pmod = K1 \frac{s+a}{s+b} i - K2\ i^2 \frac{1}{s+b}$$

with:

$$b = \frac{1}{R_{thJ-A} C_{thJ-A}}$$

$$a = \frac{1}{R_{thJ-A} C_{thJ-A}} - \frac{IomVD}{C_{thJ-A} g(1 - mTo')}$$

If, before or after modulation, we carry out a correction $$i = i' \frac{s+b}{s+a}$$

(according to the expressions of a and b we see that a<b), the modulated power will be:

$$Pmod' = K_1 i' - K2 \left( \frac{s+b}{s+a} \right)^2 \frac{1}{s+b} (i')^2$$

Considering the attenuation effect of the low frequencies, due to the correction filter placed at the input, $(i')^2$ will be low and so the second term will be negligible for low frequencies and also negligible for high frequencies for:

$$\left( \frac{s+b}{s+a} \right) \frac{1}{s+b} \longrightarrow 0 \text{ when } s \longrightarrow \infty$$

Therefore, the modulation is brought back to:

$Pmod' = K_1 i'$ independent of the frequency.

Thus two filters are required for passing the low frequencies: a high-pass filter 8 at emission and a low-pass filter 6 at reception whose role is to avoid distortion as a function of the low-frequency level and a low-pass filter 7 correcting the thermal effects at low frequencies and at a low level. The first two filters avoid the appearance of nonlinear thermal phenomena and the third one corrects the linear thermal effects.

The two nonlinear thermal-effect correction filters 8 and 6 must have reverse transfer functions so that their effects are mutually offset.

Figure 9A:
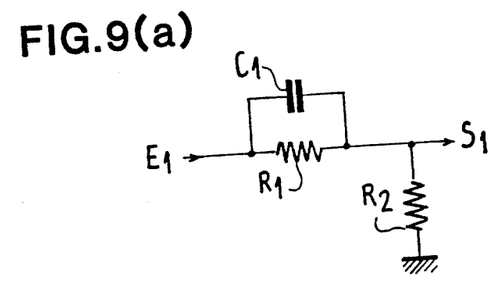
FIGS. 9a and 9b, an example of a high-pass filter usable at emission with its transfer function.
Figure 9B:
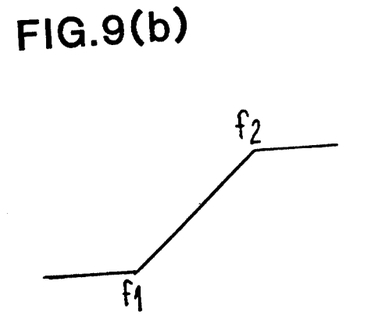

FIG. 9 give an example of a high-pass filter 8 usable at emission as well as its transfer function.

This transfer function is:

$$T_E = \frac{s + \frac{1}{R1C1}}{s + \frac{1}{\frac{R1R2}{R1+R2}C1}}$$

and the characteristic frequencies f1 and f2 of the filter are:

$$f_1 = \frac{1}{2\pi R1C1}$$

$$f_2 = \frac{1}{2\pi \frac{R1R2}{R1+R2}C1}$$

Figure 10A:
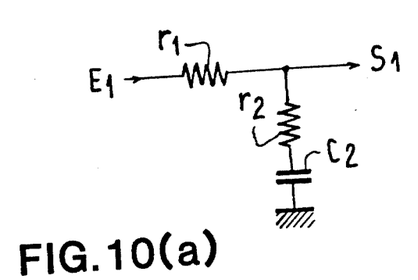
FIGS. 10a and 10b, an example of a low-pass filter usable at reception having a transfer function which is the reverse of the preceding one.
Figure 10B:
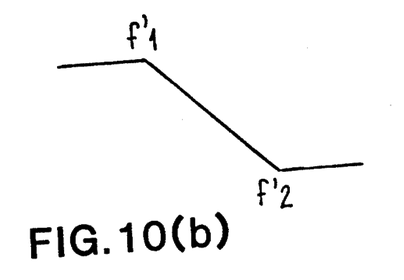

The corresponding filter 6 usable at reception is shown in FIG. 10. The transfer function of this filter is $$T_R = \frac{r2}{r1+r2} \cdot \frac{s + \frac{1}{r2C2}}{s + \frac{1}{(r1+r2)C2}}$$

and the characteristic frequencies are given by:

$$f1 = \frac{1}{2\pi(r1+r2)C2}$$

$$f1 = \frac{1}{2\pi(r1+r2)C2}$$

$$f2 = \frac{1}{2\pi r2C2}$$

The components of these filters, one at emission, the other at reception must be chosen so as to have:

$f1 = f1'$ and $f2 = f2'$, that is to say:

$F1C1 = (r1+r2)C2$ and $\frac{R1R2}{R1+R2}C1 = r2C2$

The low-pass filter 7 for correcting linear thermal effects must have a transfer function:

$$\frac{s+b}{s+a}$$

with:

$$a = \frac{1}{Rth_{J-A}Cth_{J-A}} - \frac{I_omV_D}{Cth_{J-A}g(1-mTo')}$$

$$b = \frac{1}{Rth_{J-A}Cth_{J-A}}$$

This filter is of the same type as the preceding one, only the values of the components differ.

For the two filters 8 and 6 for correcting the nonlinear thermal effect, the frequencies f1 and f2 must be chosen so as to have at the thermal cut-off frequency:

$$f_{th} = \frac{1}{2 Rth_{J-A}Cth_{J-A}}$$

a sufficient attenuation of the low frequencies at emission. We may for example take $f1 \geq 10 f_{th}$ and $f2/f1$ close to 10. Thus, the high-level low frequencies are attenuated in the zone of the frequencies of the thermal phenomena by at least 20 dB and the signal returns to its normal level from frequencies a hundred times higher than the thermal cut-off frequency $f_{th}$ which limits the nonlinear thermal effect on these frequencies.

FIG. 11 shows the complete diagram of the optical connection compensated for the low frequencies. It will be noted, and that is normal, that this diagram resembles the diagram of FIG. 6, so that the references used will be the same. From the input E of the chain we find a buffer amplifier 10 followed by a high-pass filter 8 for correcting the nonlinear thermal effects of the LED emission diode 1, separated from the filter by an amplifier 2. The optical connection 3 properly speaking feeds into a reception photodiode 4 of the PIN type followed by an amplifier 5, connected to the low-pass filter 6, whose role is to correct the nonlinear thermal effects of the LED emission diode 1. A buffer amplifier 11 separates this filter 6 from the low-pass filter 7 whose role is to correct the linear thermal effects of the LED emission diode.

It will be noted that the low-pass filter 7 for correcting the linear thermal effects due to the emission diode is shown in the case where the thermal impedance of the diode Zth is a thermal resistance shunted by a thermal capacity. In the general case, this filter must have as transfer function the reverse of the transfer function due to the thermal effect, that is to say:

$$\frac{1}{g(1-mTo') - I_omV_DZth}$$

It will also be noted that the device for biasing the emission diode, not shown in FIG. 11, may be for example a transistor 13 connected as a variable-current source and preceded by an operational amplifier 14 as shown in FIG. 12; we have $$I = \frac{Vo}{RE} - \frac{V \text{ signal}}{RE} = I_o + i$$

In what follows there will be analysed in greater detail the operation of an optical chain comprising a laser diode at emission and a photodiode of PIN type at reaction.

In this type of connection, as in the preceding case where LED diodes were contemplated, only the emitter is sensitive to the temperature, the PIN photodiode presenting a constant response.

The thermal model of the laser diode is identical to that of the LED diode and is reduced, with the use of a low thermal resistance heat sink, to a thermal impedance formed of a thermal resistance in parallel with a thermal capacity:

$$Z_{th} = \frac{Rth}{1 + Rth\, Cth\, s} \text{ with } s = j\omega$$

The optical power emitted by a laser may be linked to the current injected by the relationship:

Popt = g(I − Is)

with
  g = current-power conversion slope
  Is = threshold current

The threshold current depends exponentially on the temperature in accordance with the law:

$$Is = Iso \exp\left(\frac{T_J - T_{Jo}}{T_R}\right)$$

with:
  Iso = threshold current for a junction temperature of $T_{Jo}$
  $T_R$ = a constant having the dimensions of a temperature.

The exponential dependence of the threshold current as a function of the temperature clearly shows that in the case of current modulation about an average value, the modulated power will undergo a deformation towards the low frequencies where the temperature of the junction varies in accordance with the modulation.

It seem judicious to limit, in the same way as for the LED diode, the amplitude of the low frequencies. This limitation may be provided with the same type of high-pass filter. The low-pass filter for re-establishing the transfer function is also identical to the one used for the LED diode and is placed after the PIN photodiode.

After reduction of the level of the low frequencies, the temperature of the junction presents relatively small variations during modulation. A limited expansion of the expression giving the threshold current may then be effected, i.e.:

$$Is \# Iso\left(1 + \frac{T_J - T_{Jo}}{T_R}\right)$$

The laser current is composed of a biasing current Io and a modulation current, i.e.:

I = Io + i

Therefore, the temperature of the junction is:

$T_J = T_A + Rth V_D Io + Zth V_D i$ in which expression:
  $T_A$ is the ambient temperature
  $V_D$ the laser voltage, constant and close to 2 volts.

The value of Is may then be written $$Is = Iso\left(1 + \frac{T_A - T_{Jo} + Rth V_D Uo + Zth V_D i}{T_R}\right)$$

$= Iso(1 + \alpha + \beta Zth i)$ with $$\alpha = \frac{T_A - T_{Jo} + Rth V_D Io}{T_R}$$

$$\beta = \frac{V_D}{T_R}$$

Under the action of the current I = Io + i, the laser emits a power P = Po + Pmod (Po: continuous power; Pmod: modulated power).

$P = Po + Pmod = g(Io + i - Is)$ $= g[Io + i - Iso(1 + \alpha + \beta Zth i)]$

From this relationship, the value of the modulated power may be inferred:

$Pmod = i(g - Iso \beta Zth)$

Since $Zth = 1 + \frac{1}{Rth Cth s}$ $$Pmod = ig\left(1 - Iso\beta \frac{Rth}{1 + Rth Cth s}\right) = ig\frac{s + a}{s + b}$$

with:

$$a = \frac{1}{Rth Cth} - \frac{Iso\beta}{Cth}$$

$$b = \frac{1}{Rth Cth} \quad a < b$$

This transfer function (Pmod a function of i) is that of a high-pass filter whose response curve is similar to that of the filter of FIG. 9 and in which $$f1 = \frac{1}{2\pi a} \text{ and } f2 = \frac{1}{2\pi b}$$

The transfer function is also of the same type as that met with the LED diode, and the compensation is provided with a low-pass filter of the same type.

The optical connection with laser emitter and PIN photodiode receiver behaves then in an identical way to the chain using a LED emission diode. The diagram of this connection is then identical to the one of FIG. 11.

It may be noted that in the general case the low-pass filter for correcting the linear thermal effects due to the emission diode must have as transfer function the reverse of the transfer function due to the thermal effect, i.e.:

$$\frac{1}{g\left(1 - \frac{Iso\beta Zth}{g}\right)}$$

In what follows, there will be analysed in greater detail the operation of the optical connection comprising at emission a LED or laser diode and at reception an avalanche photodiode, by means of the complete diagram of FIG. 13.

As was seen above, the behavior of the LED diodes and the laser diodes is identical with respect to thermal phenomena. Their use with a PIN photodiode, a component insensitive to the temperature, required compensation provided by means of three filters correcting solely the thermal effect on the LED or laser diode.

Contrary to the PIN diodes, the avalanche diodes are relatively sensitive to the temperature. The gain of these diodes decreases with the junction temperature and, for this reason, the variation of the light flux striking the diode causes, for low frequencies, a distortion comparable to that met at the level of the LED or laser diode.

When a power $P=Po+p$ in which Po is the continuous power and p the modulation power strikes the avalanche photodiode, it produces a current $$I=Io+i$$

in which Io is the continuous current and i the modulation current.

$I=GP$ with G: power-current conversion slope.

This relationship is valid for a given supply voltage Va as well as for a junction temperature $T_J$.

Since the supply voltage of an avalanche diode is relatively high and since the voltage drop at the terminals of the resistance which converts the current into voltage is very low, $IR<<V_a$, the electric power dissipated in the photodiode is $P_E=V_a.I$.

The power-current conversion slope G decreases as a function of the temperature of the junction according to a law given approximately by the relationship:

$$G = \frac{Go}{1 + \frac{T_j - T_o}{T_R}}$$

with:

Go slope for $T=T_o$ (reference temperature)
$T_R$ a constant.

Considering the high-pass filtering achieved at the level of the emitter (LED or laser), the power variations for the low frequencies are very small and so the temperature of the junction of the photodiode varies little with respect to the value of To obtained in the absence of modulation ($P=Po$).

Therefore:

$$\frac{T_j - T_o}{T_R} < <1$$

and:

$$G \# Go\left(1 - \frac{T_j - T_o}{T_R}\right)$$

The junction-ambient thermal impedance may again be represented by a thermal resistance Rth shunted by a thermal capacity Cth:

$$Zth = \frac{Rth}{1 + Rth\,Cths} \text{ with } s = j\omega$$

The temperature of the junction may be written:

$$T_J = T_A + RthV_aIo + ZthiV_a = T'_A + ZthiV_a$$

with $T_{A'} = T_A + RthV_aIo$.

The value of $(T_j-T_o)/T_R$ is:

$$\frac{T_{A'} - T_o + ZthiV_a}{T_R} = \alpha + Zthi$$

with:

$$\alpha = \frac{T_A + RthV_aIo - T_o}{T_R}$$

$$\beta = \frac{V_A}{T_R}$$

Therefore:

$$I = Io + i = Go(1 - \alpha - ZthI\beta)(Po + p)$$

$$Io = Go(1-\alpha)Po$$

$$i = Go(1-\alpha)p - GoZthi\beta(Po+p)$$

The conversion slope for the modulated signal is:

$$\frac{i}{P} = \frac{Go(1 - \alpha)}{1 + GoZth\beta(Po + p)}$$

For the low modulation frequencies, p is limited by the high-pass correction filter at emission, for high frequencies $Zth \to 0$ and so $p+Po$ does not arise.

So we may write:

$$\frac{i}{P} \# \frac{Go(1 - \alpha)}{1 + GoZth\beta Po}$$

By replacing Zth by its value we obtain:

$$\frac{i}{P} \# \frac{Go(1 - \alpha)}{1 + G\beta Po \frac{Rth}{1 + Rth\,Cths}}$$

$$= Go(1 - \alpha)\frac{s + a}{s + b}$$

with:

$$a = \frac{1}{RthCth}$$

$$b = \frac{1}{RthCth} + \frac{GoPo}{Cth} \quad b > a$$

$$= \frac{1}{RthCth} + \frac{GoPoV_a}{T_RCth}$$

It can be seen that the thermal effect of the avalanche photodiode occurs at a low level in the form of a high-pass transfer function identical to that met with for the LED or laser diodes.

This linear action may be counterbalanced with a low-pass filter of an identical type to those already used at reception in the connections with PIN diode.

It may be noted that the low-pass filter 7 for correcting the linear thermal effects due to the emission diode is shown in FIG. 13 in the case where the thermal impedance of the emission diode Zth is a thermal resistance shunted by a thermal capacity.

In the general case, this filter must have as transfer function the reverse of the transfer function due to the thermal effect, i.e.:

$$\frac{1}{g(1 - mTo') - IomV_DZth'}$$

when the emission diode is a LED diode, $$\frac{1}{g\left(1 - \frac{I_{so}\beta Z_{th}'}{g}\right)}$$

when the diode is a laser diode.

In these expressions, $Z_{th}'$ represents the thermal impedance of the emission diode.

The low-pass filter correcting the linear thermal effects due to the emission diode is also shown in FIG. 13 in the case where the thermal impedance $Z_{th}$ of the reception diode is a thermal resistance shunted by a thermal capacity. In the general case, this filter must have as transfer function the reverse of the transfer function due to the thermal effect, i.e.:

$$\frac{1 + G_o Z_{th}\beta P_o}{G_o(1 - a)}$$

FIG. 13 shows the complete diagram of the compensated optical connection when, with the emission diode being a LED diode or a laser diode, the reception photodiode is an avalanche photodiode. It will be noted a priori that the diagram of the connection resembles that already shown in FIG. 6 and FIG. 11 so that for identical or equivalent circuits the references used are the same. From the input E, we find the amplifier 10 followed by the high-pass filter 8 correcting the nonlinear thermal effects of the emission diode, the amplifier 2 connected to the emission diode 1, the optical connection properly speaking 3, an optical fiber for example, which feeds into the reception diode, of the avalanche type 40 with its load resistance R. This photodiode is connected to an amplifier 5 followed by the low-pass filter 6 for correcting the nonlinear thermal effects of the emission diode, connected to a buffer amplifier 11 followed by filter 7 for correcting the linear thermal effects of the emission diode. A buffer amplifier 12 connected at the output of filter 7, is connected to the low-pass filter 9 for correcting the linear thermal effects of the avalanche photodiode 40. A buffer amplifier 15, in FIG. 13, connects filter 9 to the output S of the connection.

Thus an optical-connection direct-light modulation information transmission system has been described and more particularly an optical connection for which it is sought to extend the passband to the low frequencies and continuous waves.

What is claimed is:

1. A direct-light modulation information transmission system comprising:
    optical emission means having an output emitting diode for converting electrical signals to be transmitted into optical signals by direct modulation;
    an optical connection for transmission of the said optical signals;
    optical receiver means having an input photodiode for converting conversely said transmitted optical signals into electrical signals; and
    means to prevent signal deformations which may result from temperature junction of said respective diodes, so as to extend the passband of the system to low frequencies and continuous waves, said means comprising:
        first filtering means for avoiding non-linear thermal effects from said diodes, said first filtering means comprising high-pass filter means, coupled to said emission means, for reducing the level of said electrical signals whose frequency is lower than a predetermined low-frequency value, and first low-pass filter means, coupled to said receiver means, and having a reverse transfer function of said high-pass filter, for reestablishing the level of said low frequency electrical signals, and
        second filtering means for compensating linear thermal effects from said diodes, said second filtering means comprising at least one second low-pass filter means, coupled to said receiver means, for compensating the linear thermal effects produced by said emitting diode on low-frequency electrical signals passing through said high-pass filter.

2. A transmission system as claimed in claim 1 wherein said input photodiode comprises a PIN photodiode.

3. A transmission system as claimed in claim 1, wherein said output emitting diode comprises a light emitting diode.

4. A transmission system as claimed in claim 1, wherein said output emitting diode comprises a laser diode.

5. A transmission system as claimed in claim 1, wherein said optical receiver means comprises amplifier circuits connected to said input photodiode, and said first and second low-pass filter means are connected in series downstream of said optical receiver means.

6. A transmission system as claimed in claim 1 wherein said second filtering means comprises a third low-pass filter means, coupled to said receiver means, for compensating the linear thermal effects produced by said input photodiode on the said optical signals received corresponding to low frequency electrical signals.

7. A transmission system as claimed in claim 6 wherein said input photodiode comprises an avalanche photodiode.

8. A transmission system as claimed in claim 6, wherein the optical receiver means comprises amplifier circuits connected to said input photodiode, and said first, second and third low-pass filter means are connected in series downstream of said optical receiver means.

* * * * *